(12) United States Patent
Rao

(10) Patent No.: US 9,485,211 B2
(45) Date of Patent: *Nov. 1, 2016

(54) SOCIAL NETWORKING WEBSITE SYSTEM WITH AUTOMATIC PARTICIPATION BASED ON CURRENT LOCATION INFORMATION

(71) Applicant: Bindu Rama Rao, Laguna Niguel, CA (US)

(72) Inventor: Bindu Rama Rao, Laguna Niguel, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/971,786

(22) Filed: Dec. 16, 2015

(65) Prior Publication Data

US 2016/0099907 A1 Apr. 7, 2016

Related U.S. Application Data

(63) Continuation of application No. 12/386,924, filed on Apr. 24, 2009, now Pat. No. 9,246,708, which is a continuation-in-part of application No. 12/221,876, filed on Aug. 6, 2008, now Pat. No. 8,909,210.

(51) Int. Cl.
| | |
|---|---|
| *H04L 29/08* | (2006.01) |
| *H04L 12/58* | (2006.01) |
| *H04M 1/725* | (2006.01) |
| *H04W 4/02* | (2009.01) |
| *H04W 4/18* | (2009.01) |
| *G01S 19/01* | (2010.01) |

(52) U.S. Cl.
CPC .............. *H04L 51/32* (2013.01); *G01S 19/01* (2013.01); *H04L 12/588* (2013.01); *H04L 12/5865* (2013.01); *H04L 51/20* (2013.01); *H04L 67/02* (2013.01); *H04L 67/04* (2013.01); *H04L 67/1046* (2013.01); *H04L 67/18* (2013.01); *H04L 67/306* (2013.01); *H04M 1/72547* (2013.01); *H04W 4/02* (2013.01); *H04W 4/18* (2013.01); *H04L 12/5895* (2013.01)

(58) Field of Classification Search
None
See application file for complete search history.

(56) References Cited

U.S. PATENT DOCUMENTS

| | | | | |
|---|---|---|---|---|
| 6,259,917 | B1 * | 7/2001 | Elzein ................... | H04W 48/18 455/435.2 |
| 2006/0242581 | A1 * | 10/2006 | Manion .................. | G06Q 10/10 715/733 |
| 2007/0005654 | A1 * | 1/2007 | Schachar ............... | G06Q 10/00 |
| 2008/0030496 | A1 * | 2/2008 | Lee ........................ | G06Q 10/10 345/418 |
| 2008/0172381 | A1 * | 7/2008 | Suh ........................ | G06Q 10/06 |
| 2009/0089042 | A1 * | 4/2009 | Wald ..................... | H04M 3/568 704/2 |
| 2009/0198566 | A1 * | 8/2009 | Greenberg ............. | G06Q 30/02 707/727 |
| 2009/0215469 | A1 * | 8/2009 | Fisher ................... | H04L 12/588 455/456.3 |
| 2009/0271244 | A1 * | 10/2009 | Kalasapur ............ | G06Q 10/107 705/319 |
| 2009/0271707 | A1 * | 10/2009 | Lin .................. | G06F 17/30893 715/738 |

* cited by examiner

*Primary Examiner* — Angela Nguyen

(57) ABSTRACT

A social networking website system with automatic registration based on a current location information. Individuals are automatically enrolled into social network services based on a current location determined from their mobile devices. In particular, farmers in rural places can be enrolled into social networks in their local districts, and they can interact with others using audio and video messages employing their local languages. Such interaction can be adhoc in nature, employing audio messages, or audio and video messages. In general, automatic memberships to social networks, social groups and to discussion lists are provided to users, based on user's current location.

20 Claims, 4 Drawing Sheets

SOCIAL NETWORKING WEBSITE SYSTEM WITH AUTOMATIC PARTICIPATION BASED ON CURRENT LOCATION INFORMATION

CROSS REFERENCES TO RELATED APPLICATIONS

The present patent application is a continuation of, claims priority to, and makes reference to U.S. non-provisional patent, Ser. No. 12/386,924, entitled "SOCIAL NETWORKING WEBSITE SYSTEM WITH AUTOMATIC REGISTRATION BASED ON LOCATION INFORMATION", filed Apr. 24, 2009, which in turn is a continuation-in-part (CIP) of, claims priority to, and makes reference to U.S. non-provisional patent, Ser. No. 12/221,876, entitled "MOBILE DEVICE FOR ACCESS TO AGRICULTURAL SERVICES BY NON-LITERATE AND SEMI-LITERATE USERS", filed on Aug. 6, 2008, which issued as U.S. Pat. No. 8,909,210 on Dec. 9, 2014. The complete subject matter of the each of the above-referenced United States Patent Applications is hereby incorporated herein by reference, in their respective entirety.

BACKGROUND

1. Technical Field

The present invention relates generally to a social networks and particularly to a solution wherein a user can automatically register and subscribe to one or more social networks based on his current location.

2. Related Art

Mobile devices are becoming ubiquitous. Children carry them and so do adults. Most people working in customer facing industries use mobile phones to stay in touch with their customers and take phone calls throughout the day. Unfortunately, quite a few users of mobile phones are intimidated by technology or technically challenged, and cannot effectively use the mobile devices to solve their problems. For such people, mobile phones are useful only for voice calls. All those powerful applications on their mobile devices are beyond their capability. This is a major problem not adequately addressed by creators of mobile applications.

Social networks are a useful means to interact with other like minded individuals. They are popular with the youth and with technically savvy individuals who can work on computers. However, quite a few non-technical people are incapable of mastering the use of computers and are therefore unable to participate in such social networks. Thus, despite the growing number of computer users, millions of people still cannot participate on social networks. Some individuals who have access to a computer are still unable to master the skills required to discover, subscribe to, effectively register with and start using the social networks.

Social networks are often accessed from computers over the Internet. Sites such as Facebook and MySpace are quite popular. A user with access to a computer can open an account with these social networks, provide a detailed profile, and then participate in interacting with others. However, very few of the people in the world, especially those in third world countries have access to computers. Those that have computers do not have access to the Internet. Among those that have both a computer and access to Internet, a significant number of these do not know how to enroll in or use the social networks. Thus, access to these social networks is unavailable to a significant number of people, or is complicated.

Quite a few technology-challenged individuals would like to manipulate the tiny keyboards on mobile phones and access remote servers and manage interactions with remote applications. Unfortunately, the small keys on the keyboard, the small screens of these mobile phones, the inability to read those screens, especially outdoors in the sun, etc. make them use the mobile phones only for voice calls, even when these phones are high-end phones with complex operating systems. Thus, despite the availability of a powerful operating system and applications on the mobile phones, a significant number of users only use them for voice calls. Thus these applications go unused. There is a need to better design these applications so that they are more useable by non-technical and technology-challenged people. There is also a need to create applications that do not rely upon (or that minimize) the use of keyboards on these mobile phones.

Mobile phones are currently being sold to farmers and rural users in third world countries. Unfortunately, very few of these can read or speak in English. Most mobile phones do not provide applications that are customized to these languages. Often, within a geographical region, several different languages are spoken. Mobile operators do not support all of those local languages. Thus, screens of information provided to users or prompts for user input are often presented in the wrong and incomprehensible languages to these rural users.

Further limitations and disadvantages of conventional and traditional approaches will become apparent to one of ordinary skill in the art through comparison of such systems with various aspects of the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an elegant means of interaction between non-technical and technology-challenged individuals who employ mobile devices, wherein the individuals are automatically enrolled into social network services based on a current location determined from their mobile devices. In particular, farmers in rural places can be enrolled into social networks in their local districts, and they can interact with others using audio and video messages employing their local languages. For example, such interaction can be adhoc in nature, employing audio messages, or audio and video messages. In general, automatic memberships to social networks, associated social groups, and to discussion lists are provided to users, such as those based on user's current location.

Figure 1:
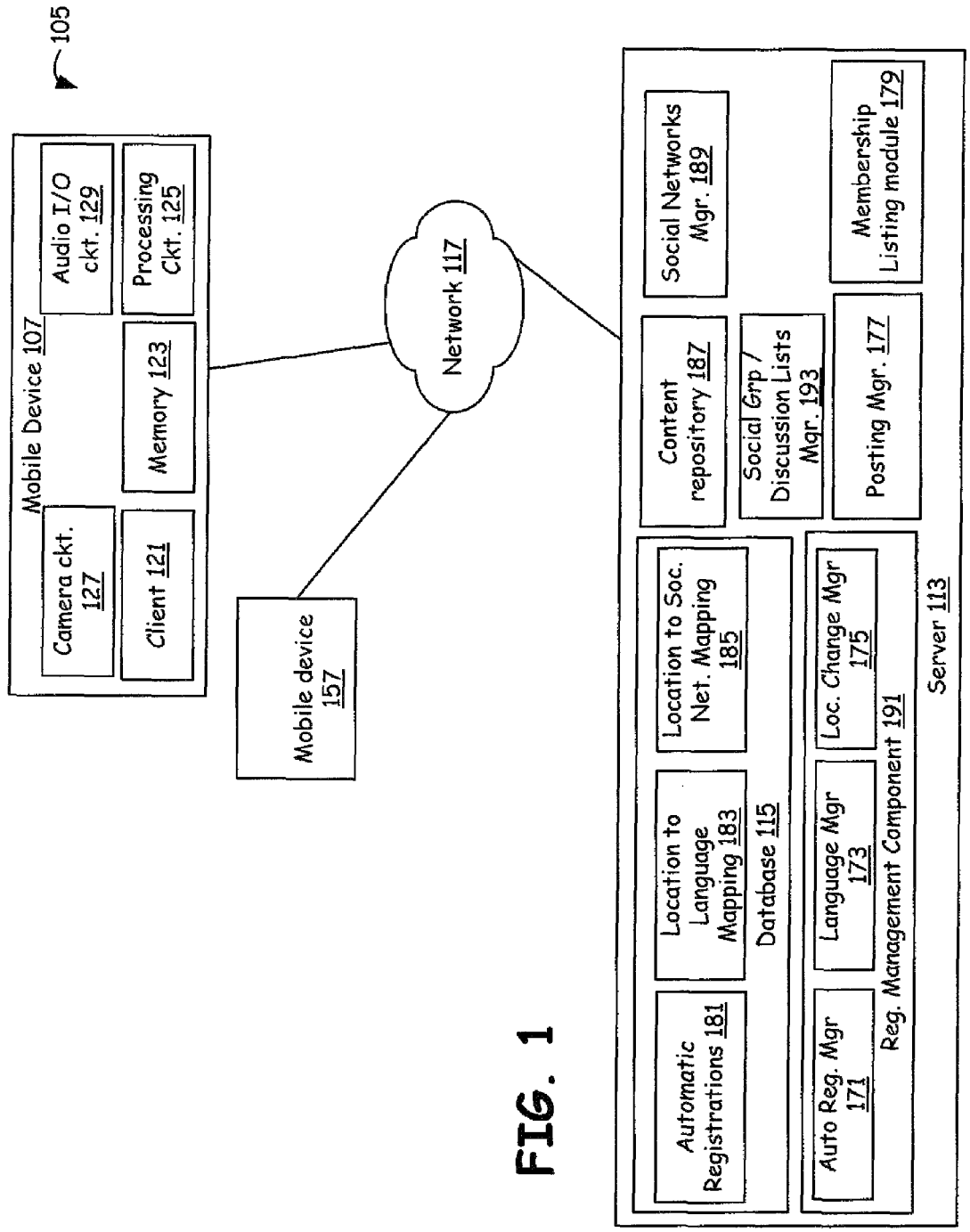
FIG. 1 is a perspective block diagram of a social networking website system that is capable of automatically registering mobile device users into one or more social networks and social groups based on a current location determined by their corresponding mobile devices.

FIG. 1 is a perspective block diagram of a social networking website system 105 that is capable of automatically registering mobile device 107, 157 users into one or more social networks and social groups based on a current location determined by their corresponding mobile devices 107, 157. A plurality of social networks are supported by the social networking website system 105, each of the plurality of social networks also form a social group for one-to-many interactions, such as posting of messages. The networking website system 105 comprises a server 113 that supports social networks and social groups, and mobile devices 107, 157 used by users to interact with the social networks and social groups. The server 113 comprises a registration management component 191, a content repository 187, a social networks manager 189, a social groups/discussion lists manager 193, a posting manager 177, a membership listing module 179 and a database 115.

The database 115 comprises an automatic registrations module 181, a location to language mapping module 183 and a location to social networks mapping module 185. The automatic registrations module 181 is used to store and keep track of user registrations conducted automatically, such as those conducted during an initial power-up of the mobile phone 107. A default user profile is also stored including a geographical information (such as street, city, state, etc.) and regional language setting. The location to language mapping module 183 is employed to determine the default language for the user based on the location information. The location to social networks mapping module 185 is used to determine all appropriate social networks and associated social groups in which the user can participate and interact with. The database 115 comprises customized user profiles, user account information, user preferences and other related information too.

The posting manager 177 facilitates posting of new messages by users, collection/collation of responses to postings, retrieval of postings and responses from mobile devices 107, 157, etc. The social group/discussion lists manager 193 facilitate communicating postings to the entire social groups or discussion lists. They also facilitate determination of appropriate social networks, social groups, and discussion lists for a user based on a current location information, such as during initial power-up of the mobile device 107 by a user. The social networks manager 189 facilitates interactions between members of a social network. It also manages life-cycles of social networks, such as creation, deletion, enhancements, addition of applications and widgets, updates, etc. The membership listing module 179 facilitates enumeration of membership lists for the social networks, the social groups, the discussion lists, etc. It also manages interactions with external systems to retrieve membership lists from external social networks or listserv servers.

The content repository module 187 makes it possible to store content, manage content, include them in posting, and broadcast content via one or more social networks and one or more social groups. Content is stored in the content repository 187 until they are broadcast or otherwise shared with one or more users, such as by posting to a social group. Some types of content is communicated by the social networking website system 105 to members of social groups periodically while some other types are delivered only when instructed by a user. Some types of content that are delivered more than once, or periodically, are also updated when necessary, such as when a new version of such content is made available. Content that has to be delivered periodically, such as market prices of commodities, to members of a social group are delivered in a push mode by the server 113.

The mobile device 107 comprises a client 121 that receives posted messages for one or more social networks and social groups and displays them, a processing circuitry 125 the executes applications such as the client 121, a memory 123, an audio input/output circuitry 129 and a camera circuitry 127. A user can employ the client to interact with the social networking website system 105. Specifically, the user can post new messages using the client 121, wherein such new messages comprise an audio message recorded using the audio input/output circuitry 129 and a digital photo taken employing the camera circuitry 127. The new messages are communicated to social networks selected by the user (from those made available to the user or subscribed to by the user) or to social groups to which the user has registered, etc. The user can also communicate the new messages to individual members of the social networks. Using the client 121, the user of the mobile device 107 can review messages posted to social networks, and provide responses to such messages employing audio data recorded by the user on the mobile device 107, video data recorded by the user, or a combination thereof, etc.

The present invention automatically enrolls mobile phone users into social network services that focuses on building online communities of people who share their interests and/or activities. These social network services, supported by the social networking website system 105 are mobile-phone based and also web-based, and provide a variety of ways for users to interact, such as via adhoc audio messages sent from one person to many recipients, and instant messaging services. These social networking services encourage registered members to experience new ways to communicate and share information. The social networking services included are those which contain category divisions (such as rice farmers in Tamil Nadu, or Vanilla growers in Karnataka), means to connect with colleagues and business partners (employing audio and video description pages) and personal recommendations of other members.

Registered users of social networks supported by the server 113 can upload a picture of themselves from their mobile devices 107, 157, create their 'profile' with audio descriptions of themselves and their interests, and can often be "friends" with other users. To be included in a friends list for a user, both users must confirm that they are friends before they are linked. These social networks are provided with privacy controls that allow the user to choose who can view their profile or contact them, etc.

The present invention not only makes it possible for users to automatically register with one or more social networks (supported by the server 113, or by other external servers too) based on a current location obtained from the mobile devices 107, 157, but also provides them the ability to set up and customize a personal 'profile'. It also presents users with an ability to comment on topics of interest and specify fine granular control of who sees what (based on privacy settings). It makes it possible to block an unwanted member, have own page of personal (blog like) entries with audio messages, video messages, etc.

In addition to registering automatically in discussion lists and social networks, users of mobile devices 107, 157 have the ability to create their own social groups that share common interests or affiliations. Users can upload or stream live videos, and hold discussions in these groups and associated social networks. Thus user participation is arranged around geographic location, the typical/default business and social interest of people in such geographical regions, and their attributes.

In one embodiment, the social networks and associated social groups support mobility and access from mobile devices 107, 157. Thus these mobile social networks enable users of mobile devices 107, 157 to create their own profiles, make friends, participate in discussion lists, chat rooms, etc. Such users can also conduct private conversations, share photos and videos, and share blogs by using their mobile device 107, 157.

In general, the social networks supported by the server 113 also act as social groups to which members can post messages and use it as a discussion list. Using the social networks, users can post group messages to the social group associated with the social networks, wherein the group messages are viewed by other participants of the social group on their respective mobile devices. In addition, these messages can also be read on the social network's group homepage, provided by the server 113, like a web forum. Members of a social network can choose whether to receive individual posts once daily, or as soon as they are posted. Members can also read the posts at the web site supported by the server 113.

As well as providing posting and archiving facilities for the many social networks and associated social groups it hosts, the social networking website system 105 provides additional functions, such as mobile voting and calendar systems and file uploading. The basic mailing list functionality is available to post messages to other members of a social group.

In one embodiment, the server 113 supports social networks that address the needs of agribusinesses and farmers and the mobile device 107 is used by a farmer in a rural/agricultural region, such as Dekalb, Ill. The client 121 in the mobile device 107 is tailored to address the needs of farmers to provide access to agricultural information and to interact with agricultural related social networks supported by the server 113. When the use of the mobile device 107 powers up the mobile device 107, the client 121 determines a current location (GPS based current location or cell ID based current location) and communicates it to the server 113, along with the phone number associated with the mobile device 107. The server 113 employs the social networks manager 189 to determine if the user of the mobile device 107 is already registered as a user. If the user is already registered, then the social networks he is registered in, and the social groups he is registered in are determined, and this information is sent to the mobile device 107 for display to the user (such as for user selection of a social group to post a message). If the user is not yet registered, then the server 113 employs the auto registration manager 171 to register the user as a new subscriber. The new user's details are registered in the automatic registrations module 181. Then, the location change manager 175 employs the location to social network mapping module 185, to identify one or more social networks and their associated social groups for the user and communicates it to the mobile device 107. For example, social networks for "corn farmers from Illinois" and "soya bean farmers from Dekalb" are identified as default social networks for the user, and their associated social groups are also provided as default social groups with whom the user can interact with, and post messages. The automatic registrations module 181 in the database 115 is updated with this registration information for the user of the mobile device 107. Also, the language manager 173 employs the location to language mapping module 183 to identify a default language for the user (based on the current location and known information about that region) and this information is also communicated to the mobile device 107. The server 113 presents user-interface components to the mobile device 107 in the default language for the user when necessary. In this way, the new user of the mobile device 107 is automatically registered in one or more social networks and social groups. Using the client 121, the user views the listed social networks and social groups on the mobile device 107. The users then post new messages or interact with others in the one or more social networks he is automatically registered in.

When the new user of the mobile device 107 starts posting new messages to the social groups he is made a member of, the posting manager 177 facilitates broadcasting such posts to all the members of the corresponding social groups. The new messages may comprise of audio recorded by the user on the mobile device 107, video recorded by the user, textual content input by the user on the mobile device 107, a combination of these, etc. The new messages are not only broadcast to all members of the targeted social groups, such that they receive as new postings on their respective mobile devices, but also stored in the corresponding social network as the user's post and shared with others in the social network.

In one embodiment, a social network a new user of the mobile device 107 is assigned to by the server 351 comprises social network connections to individuals who provide support, help and add value to the social network. For example, when a farmer in Dekalb, Ill. is automatically registered to a "corn farmers of Dekalb, Ill." social network, he is automatically provided connections/links to local seed providers (companies that provide corn seed for example), local fertilizer distributors, local silo/warehousing companies, local banks that lend to farmers, local farmer cooperatives, experts in growing corn and corn related agricultural experts, experts in pesticides and insecticides, local exporters of corn, local corn processing plants, etc. In addition, the social group to which the farmer can broadcast his messages/posting to comprises local experts in corn farming, agricultural university professors in a local university, members of the local government addressing farming issues, etc. Content providers for such a social network include corn seed providers, corn trading companies who can provide corn prices from the Chicago Board of Trade (CBOT) or the Chicago Commodities Exchange, etc. Such content providers employ the content provider server 371 to deliver content, and the content provider manager 359 manages such delivery and schedules their broadcast to relevant social groups, and the availability of such content to relevant social networks.

The client 121 displays available social networks and a list of available social groups. The user can post to the social groups and view memberships of the social networks and interact with individual members of the social networks. For example, if a social network comprises links to an expert in a field, the client 121 makes it possible to interact with him, send him messages, seek help, etc. If the social network has a link to an agent of a local bank, the client can seek loan information, seek balance information, etc. If the social network has a link to a service, such as a banking service, the client enables conducting back transactions from the mobile device 107.

In one embodiment, the social networking website system 105 enables automatic modification of membership to social networks when a user moves to a new city or relocates to a new state. The server 113 selectively changes the membership of each of the plurality of users of the social networking website system 105 to their corresponding social networks when the user's mobile device indicates a change in its current location. Thus, after a move to a new state, the user finds himself automatically registered with a new social network (one or more social networks) with access to local information, resources, local experts, local services (banking, library, etc.). This change can be made permanent by the user, or made temporary. In a related embodiment, if the user returns to his previous location (city/state/region), the user regains his membership with the old set of social networks and social groups automatically.

Figure 2:
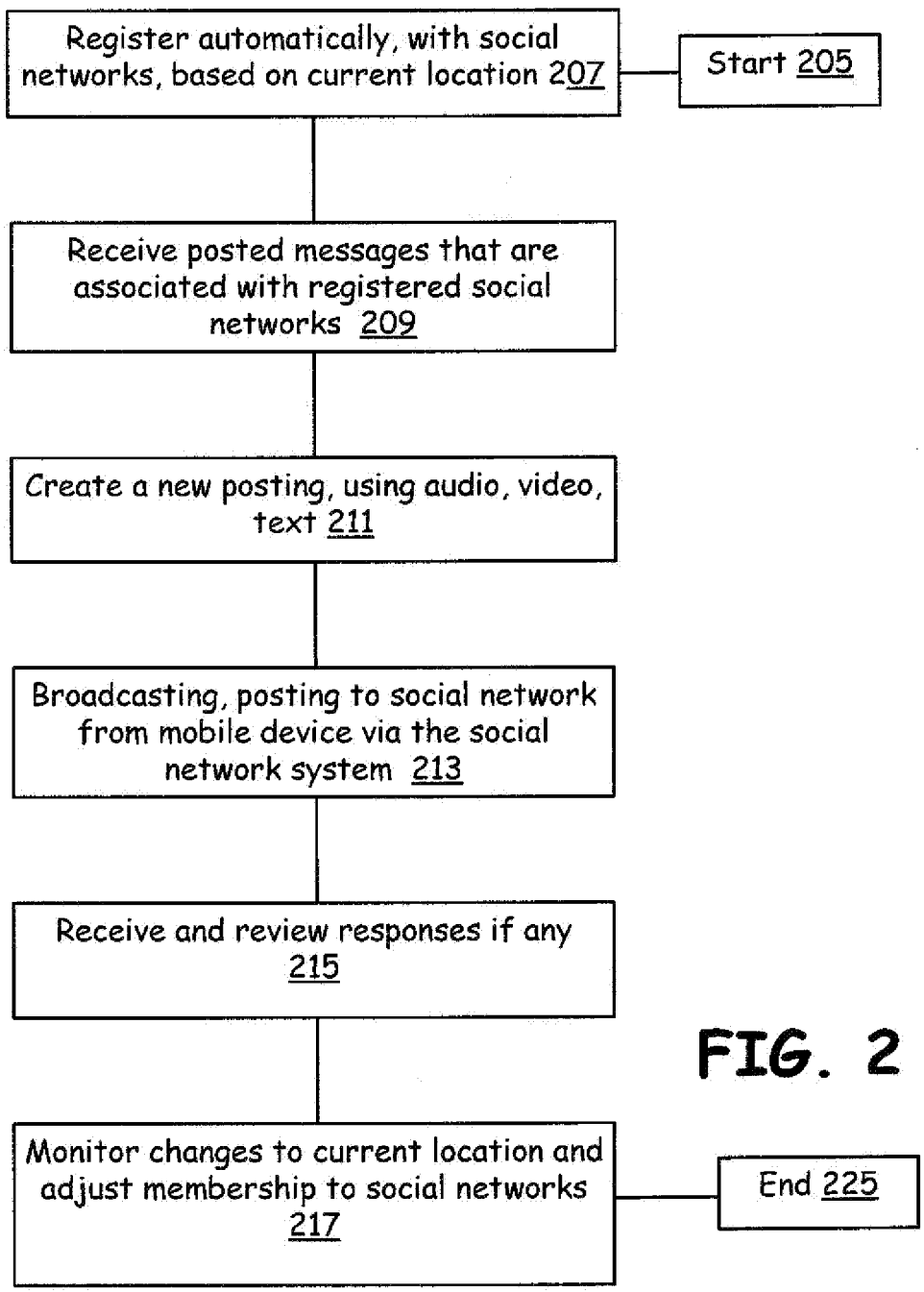
FIG. 2 is a flow chart of an exemplary operation of the social networking website system, built in accordance with the present invention.

FIG. 2 is a flow chart of an exemplary operation of the social networking website system 105, built in accordance with the present invention. At a start block 205, the operation starts when the server 113 is ready for receiving registration requests and for supporting social network interactions. Then, at a next block 207, the mobile device 107, when turned on for the first time, or when instructed by a user to do so, registers automatically with the server 113. During such registration, server 113 identifies appropriate social networks and associated social groups for the user based on a location information retrieved from the mobile device 107, user input provided by user (or from alternate sources), etc. The social networks include connections/links to others who can provide help, expertise, access to resources, access to information, etc. For example, for a farmer in Dekalb, Ill., who powers up his mobile device 107 for the first time, a social network called "corn farmers of Dekalb Ill." is provided by default, and registration into that social network, and to an associated social group "corn farmers group of Dekalb, Ill.", is conducted automatically. Alternately, the registrations are conducted at a point-of-sale by a sales agent employing a PC (for example) that communicates with the server 113. The social networks provides connection to agents of local banks that lends to farmers, agents of local insurance companies, local experts in farming, local meteorologists, local seed providers, local con tract labor, etc.

Then, at a next block 209, the mobile device 107 receives posted messages from the social networks and social groups that the user is registered with. In the case of social groups, messages posted by any member of the social groups are visible to and shared with all the members of those social groups. In the case of social networks, a message posted by the user to an individual member of his social network is not shared with others, but only with those recipients selected, and is posted on the corresponding user's web pages on those social networks.

Then, at a next block 211, the user creates a new posting and sends it to the social group currently selected. Such new posting comprises audio inputs recorded by the mobile device 107, video recorded by the mobile device 107, textual inputs provided by the user on the mobile device 107, etc. Since the target social network is typically already selected before the creation of the posting, the user need not select any recipients and is not prompted to enter any recipients. Then, at a next block 213, the new posting is broadcast to the selected social network or social group. This occurs when the mobile device 107 communicates the currently selected social network identification and the new posting to the server 113 for broadcast to all the current members of the social group or social network. The members of the social group or social network who receive the new posting review it and optionally respond to it with their own responses, wherein the responses comprise audio, video and textual inputs from them. Later, at a next block 215, the user who sent the new posting is able to receive and review responses if any. The responses are received from one or more responders, each response is in audio form, video form, as digital photo, as a textual input or a combination of these.

Subsequently, at next block 217, the server 113 monitors the current location for the user, and adjusts his membership to the social networks and social groups. For example, if the user moves to a new city or state, he is automatically registered into new social networks and social groups that are more relevant to people resident in or visiting those regions. Again, if the user wants to retain membership in social networks and social groups he was a member of before moving, he is given the opportunity to retain such membership. For example, the user is prompted to retain membership in current social networks and social groups when the server 113 detects that he has moved to a new city or state.

Then, at a next end lock 225, the operation terminates.

Some prior art solutions allow first user about to navigate using a map to a particular address, or to a historical landmark, famous restaurant, etc. However, these navigational devices, or related systems, do not help in creating property evaluations that can be stored and later shared with a user of a second device. Thus, the present invention provides features useful for the creation of property evaluations that are communicated from the first user's mobile device to a database for subsequent sharing with the second user's mobile device.

Figure 3:
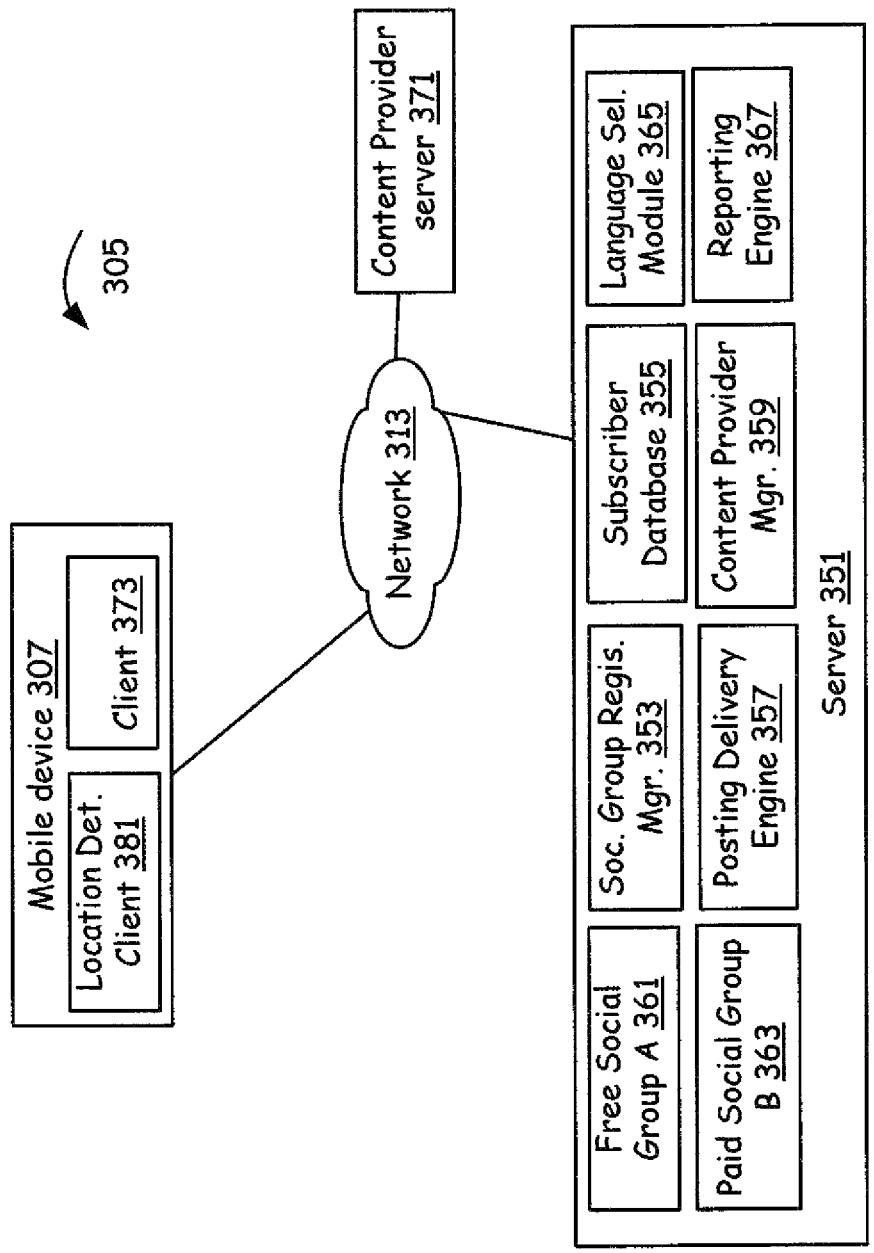
FIG. 3 is a perspective block diagram of a social group based interaction system wherein a mobile device user automatically gets registered with one or more social groups based on a location information provided by the mobile device, or based on user setup, such as during a first time use.

FIG. 3 is a perspective block diagram of a social group based interaction system 305 wherein a mobile device user automatically gets registered with one or more social groups based on a location information provided by the mobile device 307, or based on user setup, such as during a first time use. The location information is a cell identification of a mobile network determined by the mobile device 307, a GPS coordinates determined by the mobile device, etc. The social group based interaction system 305 comprises the mobile device 307, the server 351 and a content provider server 371. The server 351 comprises a posting engine 357 that facilitates broadcasting of new posting and responses to old posting by members of social groups managed by the server 351, and a content provider manager 359 that receives content from a content provider server 371 and communicates it periodically or otherwise to social groups, such as a free social group A 361 and the paid social group B 363. The server 351 also comprises one or more social groups, such as the free social group A 361 and the paid social group B 363. It also comprises a social group registration manager 353, a subscriber database 355, a language selection module 365 and a reporting engine 367.

The social group registration manager 353 is capable of mapping and assigning new users, based on a location information or other information, to one or more social groups supported by the server 351. For example, it can assign, based on a GPS coordinates of a current location of (the user of) the mobile device 307, the free social group A 361 to the user. Later, if the user so prefers, he can also register with and subscribe to the paid social group B 363. The language selection module 365 assigns a primary and a secondary language for content and user interaction screens to be presented to the user on the mobile device 307, for interactions with and posting messages to the social groups provided by the server 351.

The subscriber database 355 is used to store and manage registration information (to one or more social groups, etc.), subscriber profiles, subscriber preferences, access rights, registration renewal information, etc. It is automatically managed based on subscriber activities and input on the mobile device 307. It is also managed by administrators for social groups, etc.

The posting delivery engine 357 manages delivery of new posts\and responses to old posts to all the members of various social groups. The language selection module 365 assigns default language for users based on their current location and known information regarding primary and secondary languages (available in the subscriber database 355) for that geographical region. It also enables modifications to language settings for specific users or to entire social groups, etc.

The reporting engine 367 enables generation of periodic and adhoc reports regarding access to social groups by one or more registered users, etc. It enables generation of reports regarding popularity of various types of content that is pushed/delivered to the registered users.

A client 373 in the mobile device facilitates user interactions with the server 351 and with social groups it supports. A location determination client 381 in the mobile device provides a current location information to the client 373, such as during initial power up and registration with the server 351. The client 373 makes it possible to create audio messages, video messages, textual messages, and combinations of these, and have them sent as postings, or as responses to other postings.

One of the types of content that the content provider 371 provides is solutions to problems expressed by registered subscribers. For example, if a user of the mobile device 307 expressed a need for information regarding the eradication of a particular type of bacteria/disease from his farm, then the content provided to the user as a response, from a member of the social group or by a moderator or content provider associated with that social group is detailed information on pesticides, detailed information on food treatment techniques, etc. Thus, some of the social groups are assigned moderator accounts (members who are moderators), technical assistance accounts (members who provide technical information, etc.) and expert accounts (members deemed to be experts on the related subject matter for the social group). In one embodiment, the content provider 371 interacts with members of social groups just as another member of that group—participating in new posts wherein new content is sent to the other members of the social groups.

Figure 4:
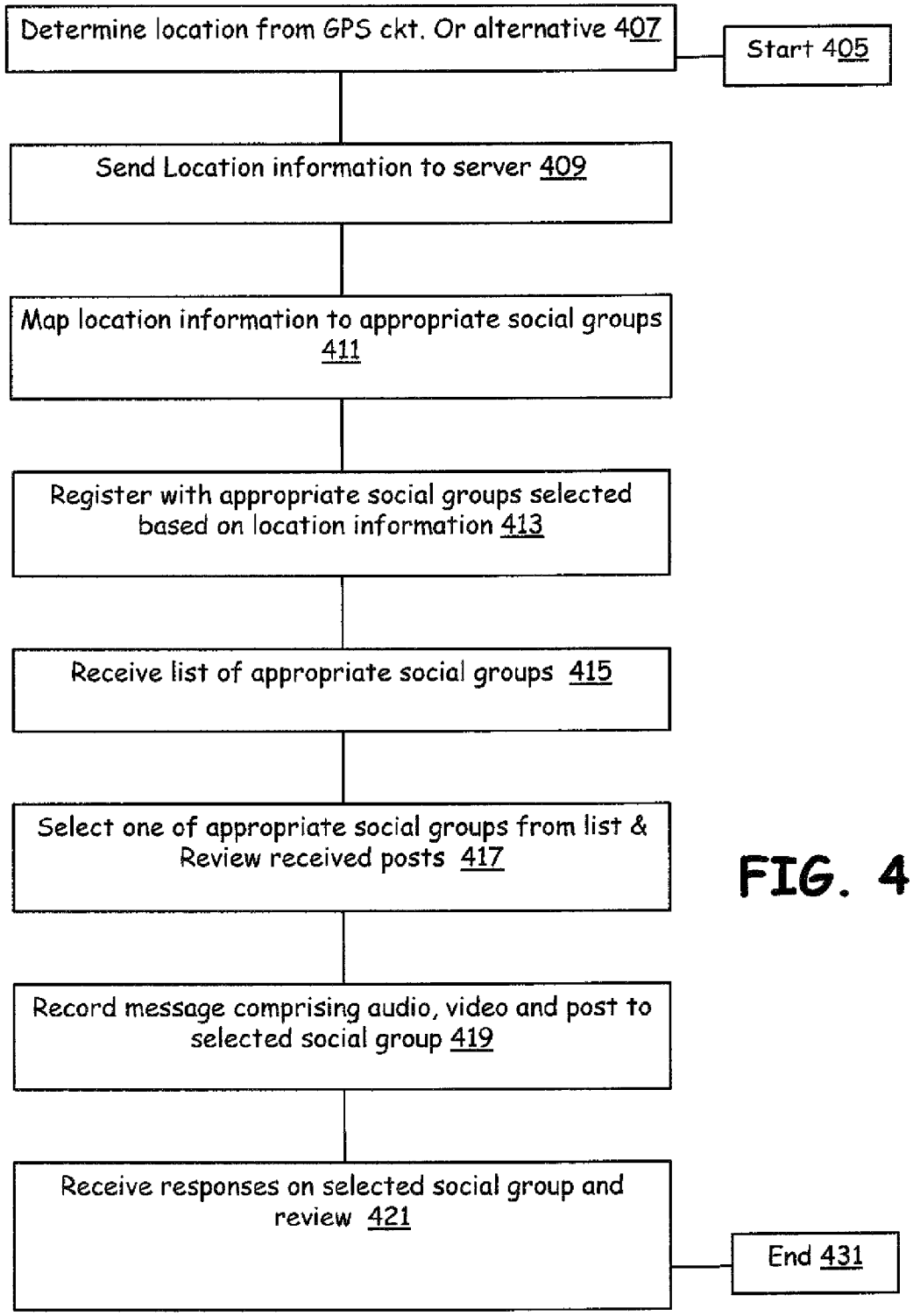
FIG. 4 is a flow chart of an exemplary operation of a social group based interaction system that determines a current location of a mobile device and automatically assigns social groups to a user.

FIG. 4 is a flow chart of an exemplary operation of a social group based interaction system 305 that determines a current location of a mobile device and automatically assigns social groups to a user. At a start block 405, the operation starts when the server 351 gets ready to interact with the mobile devices 307. Then, at a next block 407, the mobile device 307 determines location using GPS circuitry on the mobile device 307, or using a cellular identification (cell ID) determination mechanism. Mobile devices 307 that comprise GPS circuitry provide GPS coordinates when needed, to get the current location. Those that do not have GPS circuitry provide a cell ID for the current location. Other mechanisms to determine a current location are also contemplated.

At a next block 409, the location information is communicated to the server 351. Along with the location information, the mobile phone number of the mobile device 307 is communicated to the server. Optionally, device characteristics are also communicated. Then, at a next block 411, the server 351 maps the location information to appropriate social groups that the user can participate in by default. For example, for a farmer in Dekalb, Ill., who powers up his mobile device 307 for the first time, a social group "corn farmers group of Dekalb, Ill.", is considered appropriate. In some related embodiments addressing the needs of farmers, based on the current location information, the new user is provided membership into more than one social group, such as social groups for the three top crops grown in the region (three different groups), a social group for agricultural experts of the region, and a social group for agribusinesses in that region.

Then, at a next block 413, the server 351 conducts registrations with appropriate social groups selected based on the location information received from the client 373 of the mobile device 307. For example, for a farmer in Dekalb, Ill., who powers up his mobile device 307 for the first time, registration to an social group "corn farmers group of Dekalb, Ill.", is conducted automatically. Alternately, the registrations are conducted at a point-of-sale by a sales agent employing a PC (for example) that communicates with the server 351. The social groups include agents of local banks that lends to farmers, agents of local insurance companies, local experts in farming, local meteorologists, local seed providers, local contract labor, etc. Thus the social group makes it possible for the new user (the farmer in Dekalb, Ill.) to automatically gain access to, and be able to communicate with others in the region with whom he can choose to interact with, conduct business with, seek help from, seek information from, etc.

At a next block 415, the client 373 of the mobile device 307 receives a list of appropriate social groups from the server 351 and displays it to a user. Then, at a next block 417, the user selects one of the appropriate social groups from the list, and the server 351 retrieves the posts for that social group and communicates it to the mobile device 307. The user views the list of available postings, and is able to select and review any of those listed. The user can also respond to any of those postings. The user typically browses through the list provided, and reviews one or more posts.

At a next block 419, the user records a new message on the mobile device 307 comprising an audio input from the user, a video input from the user and posts it to the currently selected social group. The new message is assembled on the mobile device using the client 373, which employs a local microphone for recording audio inputs, a local camera for recording video, and a local keyboard for textual data entry by the user. The new message posted is then shared with other members of the social group using the broadcast services of the server 351. Thus, other members of the social group can review this new message on their mobile devices, and respond back to the user.

At a next block 421, the client 373 of the mobile device 307 receives responses on the selected social group and makes them available for review by the user. The responses can each comprise of a textual component, an audio component, a video component, a graphic, or a combination thereof.

Then, at a next end block 431, the operation terminates.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

Although the present invention has been described in terms of social networks and social groups, it must be clear that the present invention also applies to other types of online and mobile communities such as discussion lists, email lists, etc.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A social networking website system that supports user interactions in a plurality of social networks, the social networking website system comprising:
   a server enabling a user to participate in a plurality of social networks based on a current location information;
   the server monitoring the current location information of the user, and, based on changes to the current location, adjusting the user's membership to, or participation in, the social networks and social groups;
   the server automatically enabling communication among a plurality of mobile devices used by a corresponding plurality of users via the plurality of social networks, each of the plurality of mobile devices identifies a corresponding current location information based on GPS coordinates; and
   the server automatically, without employing invitations and explicit user acceptance, automatically registering and including a first user among the plurality of users in a new social network based on GPS coordinates of the current location of the first user's mobile device among the plurality of mobile devices;
   wherein a current location to social networks mapping is employed to determine appropriate social networks and associated social groups for the first user based on the current location.

2. The social networking website system of claim 1 wherein, the appropriate social networks and associated social groups are associated with a corresponding street, city, county, region, state or country.

3. The social networking website system of claim 1 wherein the server enables the user to participate in a plurality of social networks based on the current location and at least one of the following: businesses typically used by the user, the social interests of the user, the businesses available at the current location, and social interests of people in the current location.

4. The social networking website system of claim 1 wherein the server switches a default language on the corresponding one of the plurality of mobile devices based on its current location.

5. The social networking website system of claim 1 wherein the server comprises a content repository module that makes it possible for the user to store content, manage content, include them in a posting, and broadcast content, via one or more social networks and one or more social groups.

6. The social networking website system of claim 1 wherein the server allows adhoc audio messages or video messages sent from the first user to many recipients among the plurality of users.

7. The social networking website system of claim 1 wherein the server also provides automatic user registration to some paid social groups and user approved user registration to other paid social groups.

8. The social networking website system of claim 1 wherein the server assigns a primary and a secondary language to each of the plurality of users for content and for user interaction screens presented;
   wherein the server generates reports regarding popularity of various types of content that is pushed or delivered to the plurality of users participating in the plurality of social networks.

9. The social networking website system of claim 1 wherein the server receives the current location information along with a mobile phone number of the first mobile device, in response to which the server maps the current location information to appropriate social groups that the associated first user can participate in by default.

10. The social networking website system of claim 1 wherein the plurality of social groups to which a user is automatically included based on the current location also comprise, as members, agents of local banks that lends funds, agents of local insurance companies, local experts, local meteorologists, local service providers, and local contract labor.

11. The social networking website system of claim 1 wherein the server provides solutions to problems expressed by subscribers, to the user via the social networks.

12. A mobile device for accessing a social networking website managed by a social networking website system, the mobile device comprising:
   a memory;
   a location determination circuitry that facilitates determination of a current location;
   a processing circuitry coupled to the memory and the location determination circuitry;
   a client that is executed by the processing circuitry, wherein the client, when operable, interacts with the social networking website, without conducting any upfront registration, without sharing any user profile and without need for invitations;
   the client determining the current location of the mobile device employing the location determination circuitry and processing circuitry;
   the client automatically registering the current location of the mobile device with the social networking website system, without employing invitations and explicit user acceptance to join them, whereby the social networking website system, in response, automatically assigns the user as a member of at least one social network selected by the social networking website system from a plurality of social networks based on the current location of the mobile device; and
   the client monitors the current location for the user, and communicates changes to the current location, to adjust the user's membership to the social networks and social groups based on changes to the current location.

13. The mobile device of claim 12 wherein the mobile device receives automatic registration to free social groups and also user approved user registration to paid social groups.

14. The mobile device of claim 12 wherein the mobile device also receives assignment of a primary and a secondary language to the user for content and for user interaction screens presented.

15. The mobile device of claim 12 wherein the mobile device generates reports regarding popularity of various types of content that is pushed or delivered to the user participating in the plurality of social networks.

16. The mobile device of claim 12 wherein the client communicates an adhoc message, created by the user, to a plurality of recipients or to the at least one social network.

17. A method of managing a social network by a server, the method comprising:
   enabling, by the server, automatic participation by users of mobile devices, based on their current location determined as GPS coordinates by their corresponding mobile devices, without requiring invitations or responses to invitations;
   receiving, by the server from the mobile devices, postings for the social network, and sharing those postings with the social network;
   storing, by the server, personal recommendations created by the users for products or services, that is shared with other members of the social network; and
   connecting, by the server, a user with colleagues and business partners based on the current location of their corresponding ones of the mobile devices, for interactions via message exchanges; and
   monitoring the current location for the user, and communicating changes to the current location, in order to adjust the user's membership to the social networks and social groups, based on changes to the current location.

18. The method of managing a social network of claim 17 further comprising automatic registering, wherein the automatic registering comprises:
   determining a current location of each of the mobile devices; and
   sending, to the corresponding ones of the mobile devices, an identification of the social network after automatic enrollment of the user based on the current location and a personal profile of the user.

19. The method of managing a social network of claim 17 further comprising:
   providing connections to agents of local banks, agents of local insurance companies, local experts, local meteorologists, local product providers, and local contract labor, to members of the social network.

20. The method of managing a social network of claim 17 further comprising:
   prompting the creation of personal social groups by the users, to facilitate interaction and message sharing by the users, with others who share common interests or affiliations.

* * * * *